(12) United States Patent
Koyanagi (10) Patent No.: US 10,165,139 B2
(45) Date of Patent: Dec. 25, 2018

(54) IMAGE FORMING APPARATUS WITH MOVABLE OPERATION UNIT

(71) Applicant: KYOCERA Document Solutions Inc., Osaka (JP)

(72) Inventor: Tsuyoshi Koyanagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/643,839

(22) Filed: Jul. 7, 2017

(65) Prior Publication Data

US 2018/0041649 A1    Feb. 8, 2018

(30) Foreign Application Priority Data

Aug. 3, 2016 (JP) ................. 2016-152412

(51) Int. Cl.
| | |
|---|---|
| *G03G 15/00* | (2006.01) |
| *H04N 1/00* | (2006.01) |
| *G03G 21/16* | (2006.01) |
| *H04N 1/04* | (2006.01) |

(52) U.S. Cl.
CPC ..... *H04N 1/00496* (2013.01); *G03G 15/5016* (2013.01); *G03G 21/1647* (2013.01); *H04N 1/00411* (2013.01); *H04N 1/00538* (2013.01); *H04N 1/00559* (2013.01); *H04N 1/04* (2013.01); *H04N 2201/0094* (2013.01)

(58) Field of Classification Search
CPC ........... G03G 21/1647; H04N 1/00496; H04N 1/00411; H04N 1/00559; H04N 1/04; H04N 2201/0094

USPC .......................................... 399/107
See application file for complete search history.

(56) References Cited

U.S. PATENT DOCUMENTS

| | | | | | |
|---|---|---|---|---|---|
| 5,391,070 | A | * | 2/1995 | Ito ................ | B23Q 1/0009 425/135 |
| 6,493,600 | B1 | * | 12/2002 | Kotoku ............ | H01L 21/67253 700/111 |
| 6,795,662 | B2 | * | 9/2004 | Kudo ................ | G03G 15/5016 399/107 |
| 7,634,212 | B2 | * | 12/2009 | Asakawa .......... | G03G 15/5016 399/107 |
| 9,357,089 | B2 | * | 5/2016 | Jung ................ | H04N 1/00496 |
| 2008/0062444 | A1 | * | 3/2008 | Sugawara ......... | H04N 1/00496 358/1.9 |
| 2017/0272593 | A1 | * | 9/2017 | Kamiya ............ | G03G 15/5016 |
| 2018/0088512 | A1 | * | 3/2018 | Watanabe ......... | G03G 21/1633 |

FOREIGN PATENT DOCUMENTS

| | | |
|---|---|---|
| JP | 2001-130089 A | 5/2001 |
| JP | 2004-355019 A | 12/2004 |
| JP | 2007-316438 A | 12/2007 |

* cited by examiner

*Primary Examiner* — Susan S Lee
(74) *Attorney, Agent, or Firm* — Stein IP, LLC

(57) ABSTRACT

An image forming apparatus includes an apparatus main body, an operation unit, and a moving mechanism. The operation unit is mounted to the apparatus main body. The operation unit indicates a state of the apparatus main body and performs an input operation to the apparatus main body. The moving mechanism reciprocatably supports the operation unit between a reference position and a retracted position. The reference position overlaps a work area of the apparatus main body. The retracted position does not overlap the work area.

6 Claims, 8 Drawing Sheets

IMAGE FORMING APPARATUS WITH MOVABLE OPERATION UNIT

INCORPORATION BY REFERENCE

This application is based upon, and claims the benefit of priority from, corresponding Japanese Patent Application No. 2016-152412 filed in the Japan Patent Office on Aug. 3, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus such as a copier, a printer, and a facsimile includes an operation unit that indicates operation states of the image forming apparatus and performs predetermined input operations. Some image forming apparatuses employ an in-barrel discharge type that includes an image reading unit on an upper side of an image forming unit, and an in-barrel discharge space between the image reading unit and the image forming unit. The in-barrel discharge type image forming apparatus includes a paper-sheet discharge tray arranged on a bottom surface portion of the in-barrel discharge space, and a paper sheet discharged onto the paper-sheet discharge tray after the termination of image formation is taken out from a front side of an image forming apparatus body.

In the in-barrel discharge type image forming apparatus, when the operation unit is installed so as to project from the image reading unit on the upper portion of the image forming apparatus to the front side of the image forming apparatus, the operation unit decreases a visibility of the paper sheet discharged into the in-barrel discharge space. Therefore, there has been proposed an image forming apparatus in which a part of the operation unit is depressed toward a rear side of the image reading unit to a position where a part of the paper sheet discharged onto the in-barrel discharge space can be seen from the front obliquely upward.

There has been proposed another image forming apparatus in which the operation unit is removably attachable to a front surface of the image reading unit located on an upper portion of the in-barrel discharge space and a front surface of the image forming unit located on a lower portion of the in-barrel discharge space.

SUMMARY

An image forming apparatus according to one aspect of the disclosure includes an apparatus main body, an operation unit, and a moving mechanism. The operation unit is mounted to the apparatus main body. The operation unit indicates a state of the apparatus main body and performs an input operation to the apparatus main body. The moving mechanism reciprocatably supports the operation unit between a reference position and a retracted position. The reference position overlaps a work area of the apparatus main body. The retracted position does not overlap the work area.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 1:
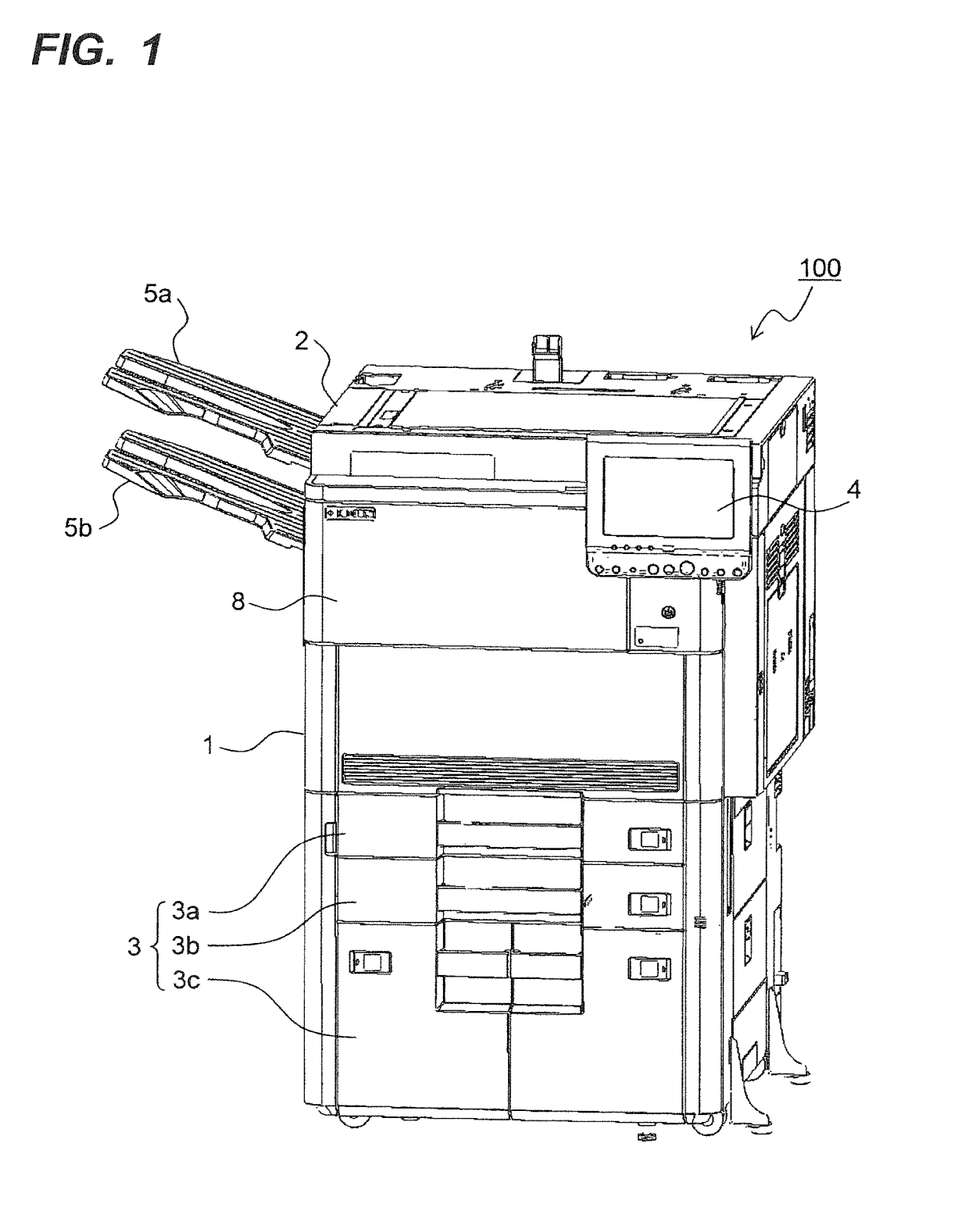
FIG. 1 illustrates an external perspective view of an image forming apparatus according to one embodiment of the disclosure.

The following describes an embodiment of the disclosure by referring to the drawings. FIG. 1 illustrates an external perspective view of an image forming apparatus 100 according to one embodiment of the disclosure. As illustrated in FIG. 1, the image forming apparatus 100 is a digital multi-functional peripheral of what is called an in-barrel paper discharge type, and includes a multi-functional peripheral main body 1 as an apparatus main body and an image reading unit 2 as the apparatus main body located on an upper portion of the multi-functional peripheral main body 1.

The image reading unit 2 reads an image of an original document as an electrical signal. The image reading unit 2 has the upper portion where a document feeder (not illustrated) that separates the original documents one by one to send into the image reading unit 2 is attached. The multi-functional peripheral main body 1 has a lower portion where a paper sheet housing space 3 constituted of sheet feed cassettes 3a to 3c for housing the paper sheets is located. The multi-functional peripheral main body 1 includes an image forming unit, a transfer unit, a fixing unit (each of which are not illustrated) and similar unit. The image forming unit forms a toner image on a paper sheet based on an electrical signal of a document image read by the image reading unit 2. The transfer unit transfers the image on the paper sheet fed from the paper sheet housing space 3. The fixing unit fixes the toner image transferred on the paper sheet.

An operation panel 4 as an operation unit is located from a side surface of the image reading unit 2 so as to overlap the front of the multi-functional peripheral main body 1. The operation panel 4 includes a liquid crystal display, an LED, and similar unit. The liquid crystal display indicates an image formation condition and a printing number of copies, and functions as a touch panel performing an input operation. The LED indicates a state of the image forming apparatus 100. Furthermore, the operation panel 4 includes a start button, a stop/clear button, a reset button, and similar button. The start button is a button with which a user instructs to start an image formation. The stop/clear button is a button used in a case where the image formation is aborted or similar case. The reset button is a button used in a case where various settings of the image forming apparatus 100 are returned to a state of default. The multi-functional peripheral main body 1 has a side surface (left side surface of FIG. 1) where discharge trays 5a and 5b onto which the paper sheet after the toner image is fixed is discharged.

Between the multi-functional peripheral main body 1 and the image reading unit 2, an in-barrel discharge space 6 as a work area (see FIG. 13) is formed to widely open toward a front side of the image forming apparatus 100. On the upper portion of the in-barrel discharge space 6, a conveyance unit 7 (see FIG. 13) is removably attachably located to guide the paper sheet into a paper-sheet postprocessing unit (not illustrated) where postprocessing is performed on the paper-sheet after the toner image is fixed. In FIG. 1, the multi-functional peripheral main body 1 does not include the paper-sheet postprocessing unit, and the paper sheet passed through the fixing unit passes through the inside of the conveyance unit 7 to be discharged onto the discharge tray 5a or the discharge tray 5b. The discharge tray 5a serves as, for example, a mailbox onto which the paper sheet where an image transmitted by facsimile is printed is discharged.

In front of the in-barrel discharge space 6, an opening/closing cover 8 is located, and as illustrated in FIG. 1, closing the opening/closing cover 8 hides inside the in-barrel discharge space 6.

Figure 2:
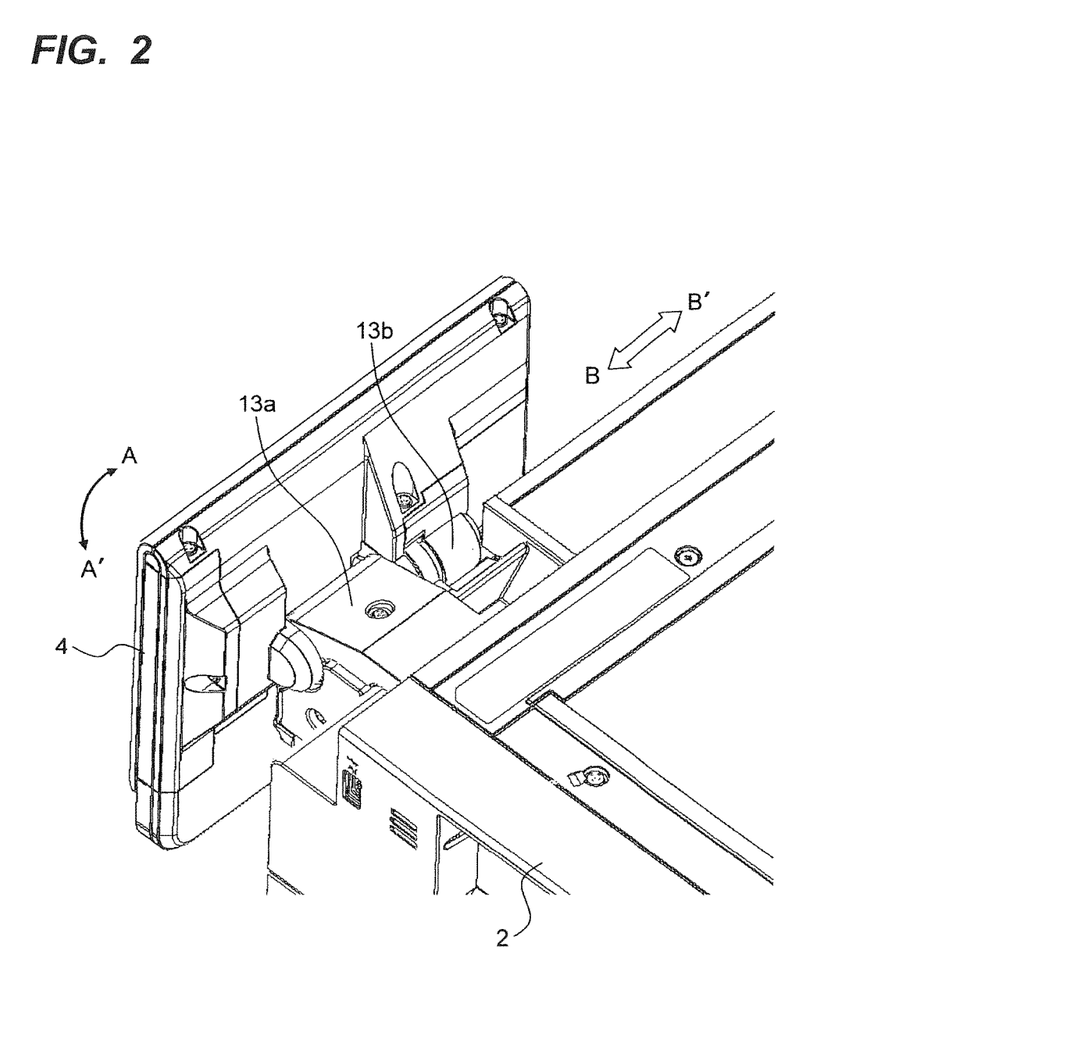
FIG. 2 illustrates a perspective view of an operation panel mounted on an image reading unit viewed from a back side.
Figure 3:
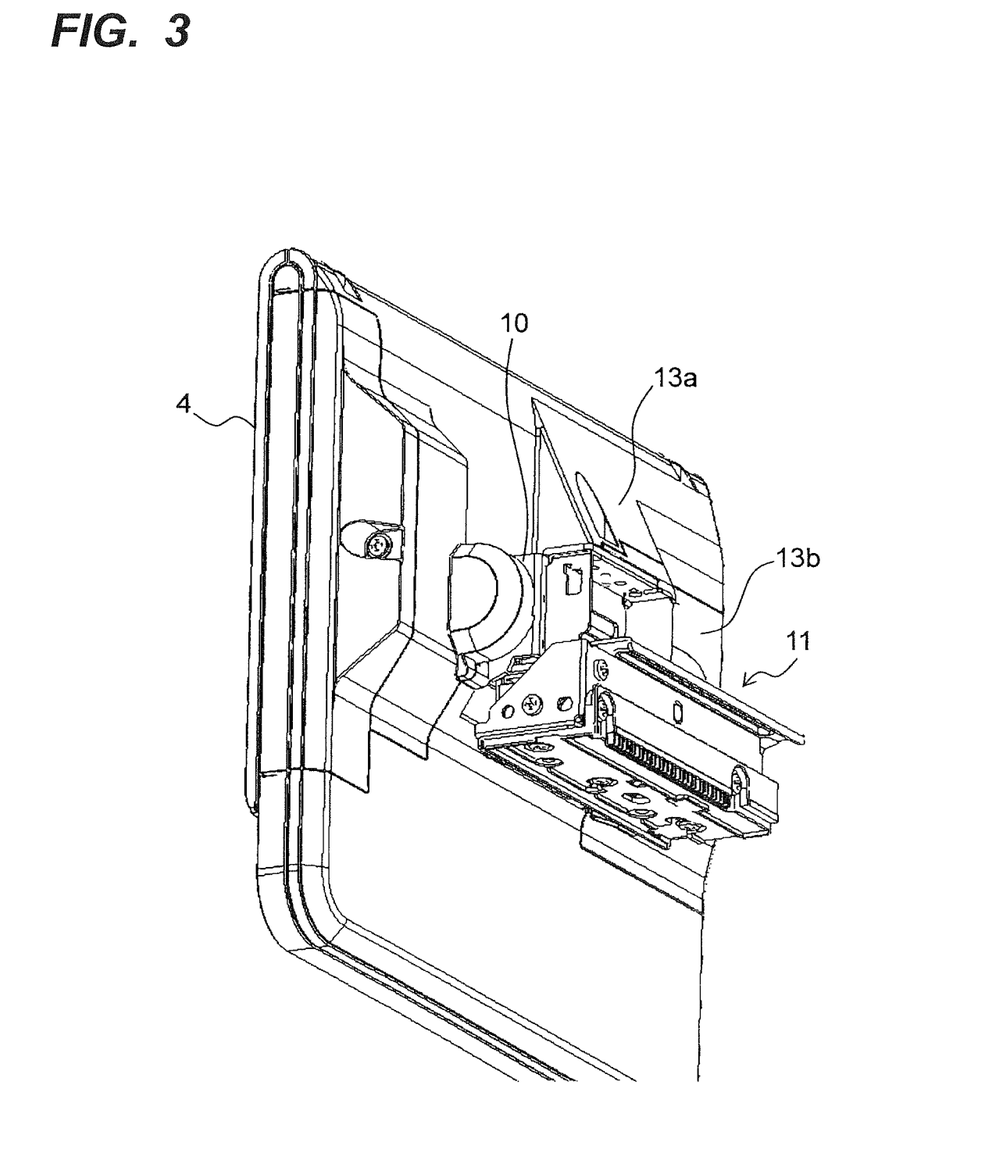
FIG. 3 illustrates a perspective view of the operation panel and a supporting member, viewed from the back side in a state where both of them are removed from the image reading unit.

FIG. 2 illustrates a perspective view of the operation panel 4 mounted on the image reading unit 2 viewed from a back side, and FIG. 3 illustrates a perspective view of the operation panel 4 and a supporting member 11 as a moving mechanism viewed from the back side in a state where both of them are removed from the image reading unit 2. The operation panel 4 has a back surface where a mounting stay 10 is attached. To the mounting stay 10, a turning shaft 4a (see FIG. 7) of the operation panel 4 is turnably supported, and turning the turning shaft 4a with respect to the mounting stay 10 can adjust an angle of the operation panel 4 in a vertical direction (arrow AA' direction).

The mounting stay 10 is secured to the supporting member 11. The supporting member 11 is supported movably in a horizontal direction (arrow BB' direction) to a mounting portion 2a as the moving mechanism (see FIG. 7) formed on a front surface of the image reading unit 2. Accordingly, the operation panel 4 is mounted on the front surface of the image reading unit 2 via the mounting stay 10 and the supporting member 11 such that the operation panel 4 is movable in the horizontal direction and has the angle in the vertical direction adjustable. In a state where the operation panel 4 is mounted, cover members 13a and 13b are located to cover the mounting stay 10 and the supporting member 11.

Figure 4:
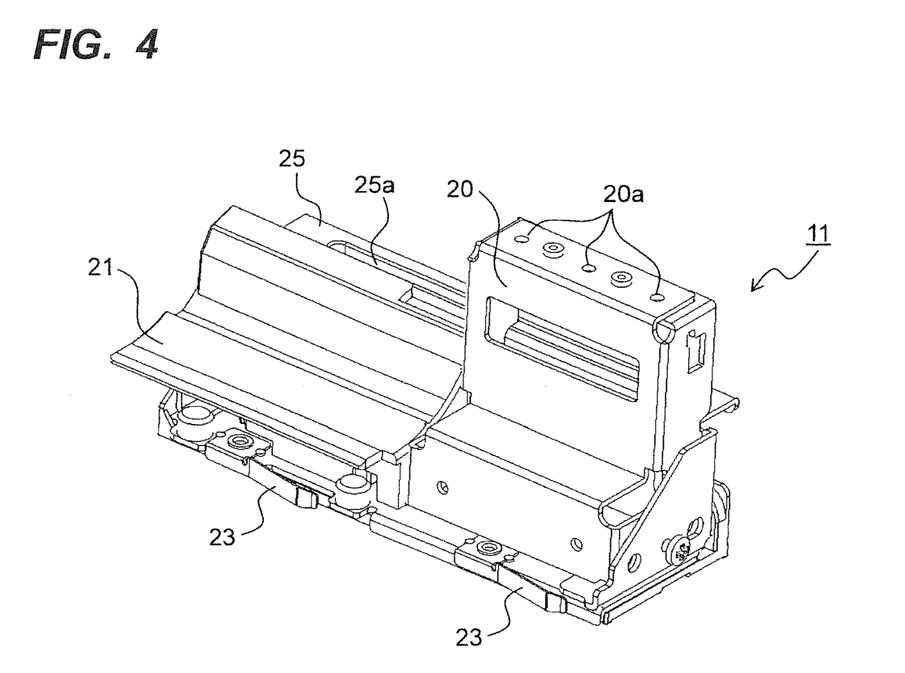
FIG. 4 illustrates a perspective view of the supporting member viewed from a front side.
Figure 5:
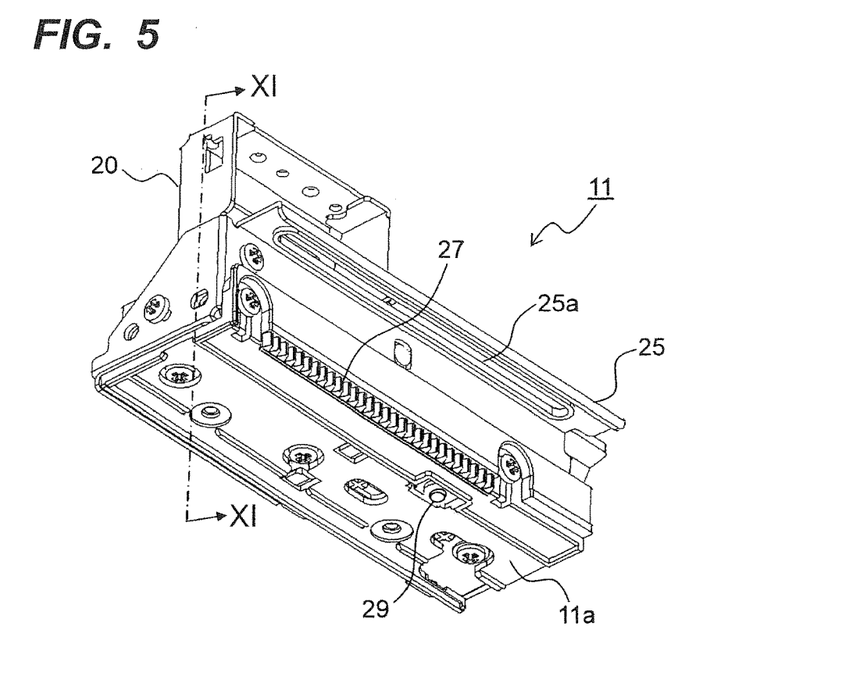
FIG. 5 illustrates a perspective view of the supporting member viewed from a back side.

FIGS. 4 and 5 illustrate perspective views of the supporting member 11 viewed from a front side and a back side, respectively. As illustrated in FIG. 4, on the front surface (opposed surface to the operation panel 4) of the supporting member 11, a supporting portion 20, to which the mounting stay 10 is secured, and a curved surface portion 21, which opposes the cover member 13b that covers the turning shaft 4a of the operation panel 4, are located. The supporting portion 20 has a top surface where screw holes 20a are formed to fix the mounting stay 10 with screws. On the front surface of the supporting member 11, leaf springs 23 as first urging members are attached at two positions on the lower side.

As illustrated in FIG. 5, on the back surface (opposed surface to the image reading unit 2) of the supporting member 11, a rail 25 is formed including an elongated hole-shaped sliding hole 25a. On the back surface of the supporting member 11, a comb-shaped rack 27 is formed on the lower side, and on a bottom surface 11a of the supporting member 11, a positioning protrusion 29 is located.

Figure 6:
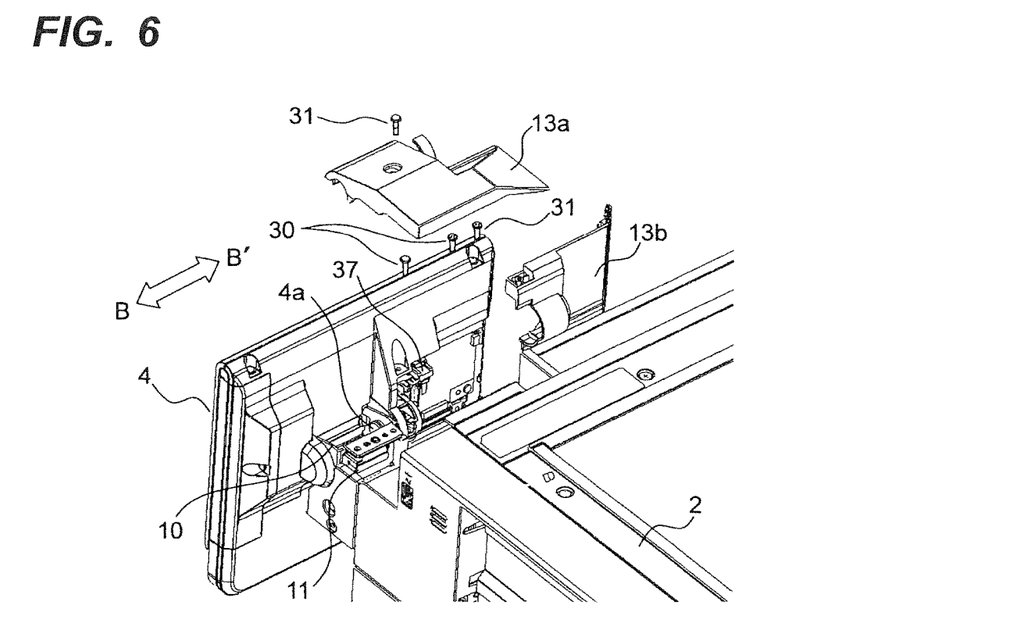
FIG. 6 illustrates a perspective view of the operation panel indicating a state where cover members are removed from the state of FIG. 2.
Figure 7:
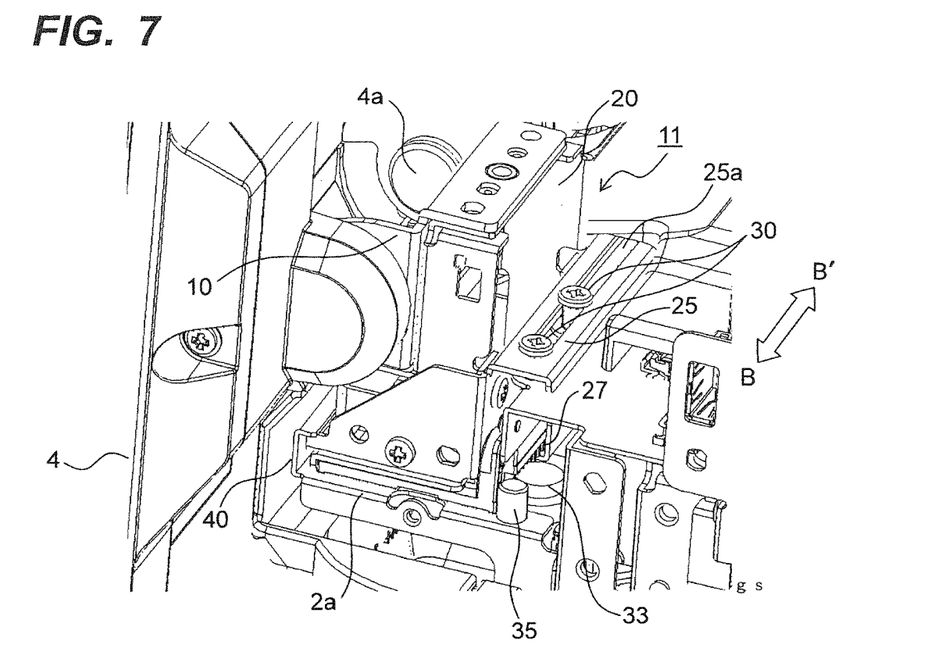
FIG. 7 illustrates an enlarged perspective view of a peripheral of the supporting member mounted on the image reading unit, indicating a state where the operation panel is arranged inside an outer edge of the image forming apparatus.
Figure 8:
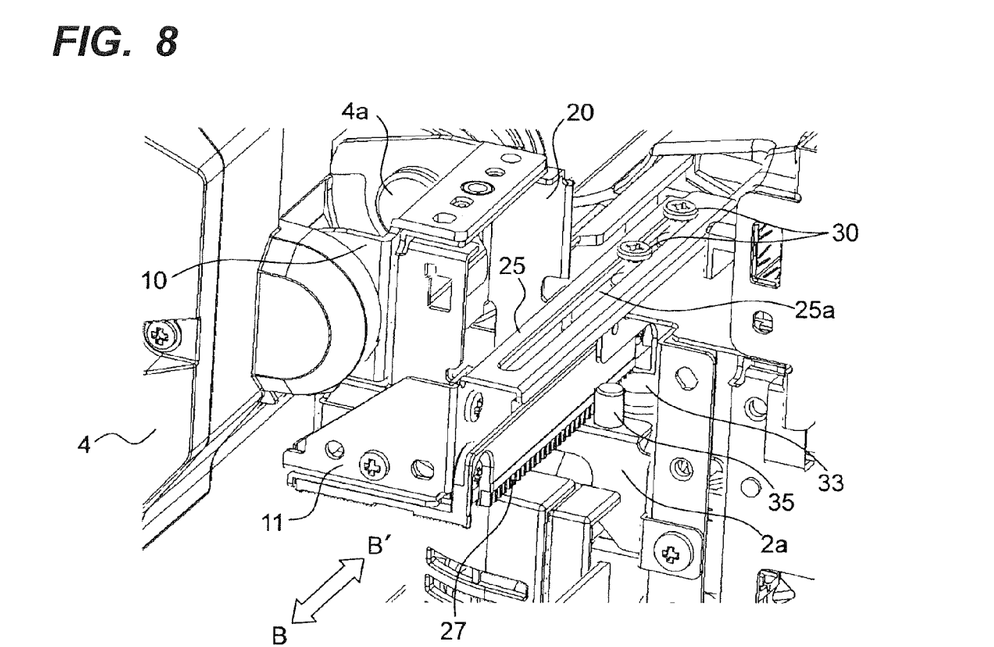
FIG. 8 illustrates an enlarged perspective view of the peripheral of the supporting member mounted on the image reading unit, indicating a state where a part of the operation panel projects outside the outer edge of the image forming apparatus.

FIG. 6 illustrates a perspective view of the operation panel 4 indicating a state where the cover members 13a and 13b are removed from the state of FIG. 2. FIGS. 7 and 8 each illustrate an enlarged perspective view of the peripheral of the supporting member 11 mounted on the image reading unit 2. FIG. 7 indicates a state (see FIG. 1) where the operation panel 4 is arranged inside an outer edge of the image forming apparatus 100. FIG. 8 indicates a state (see FIG. 12) where a part of the operation panel 4 projects outside the outer edge of the image forming apparatus 100. By referring to FIGS. 6 to 8, a description will be given of a mounting procedure of the operation panel 4 to the image reading unit 2. First, the mounting stay 10 located on the back side of the operation panel 4 is fixed to the supporting portion 20 of the supporting member 11 with screws. This causes the operation panel 4 and the supporting member 11 to be integrated as illustrated in FIG. 3.

Next, the supporting member 11 integrated with the operation panel 4 is mounted to the mounting portion 2a. Specifically, two holding screws 30 are inserted into the sliding hole 25a of the rail 25 formed on the back side of the supporting member 11, thus fastening the two holding screws 30 to screw fixing holes (not illustrated) of the mounting portion 2a. The holding screw 30 is formed to have an outer diameter of the shaft portion smaller than a width of the sliding hole 25a, and have an outer diameter of the head, formed on an upper end of the shaft portion, larger than the width of the sliding hole 25a. That is, the holding screws 30 hold the rail 25 so as not to be removed from the mounting portion 2a, and movably engage with the sliding hole 25a. This configuration slidably supports the supporting member 11 with respect to the mounting portion 2a in the horizontal direction (arrow BB' direction) in a range of the sliding hole 25a.

The mounting portion 2a includes a rotary damper 33 as a load applying member and a position regulating pin 35. In a state where the supporting member 11 is mounted to the mounting portion 2a, the rotary damper 33 engages with the rack 27 of the supporting member 11. The rotary damper 33 generates a large load (damping force) when the rotation speed is high, and generates a small load when the rotation speed is low. Then, the rotary damper 33 transmits the load to the rack 27 as a brake force. The position regulating pin 35 has a function in abutting contact with an upper side of the rack 27 of the supporting member 11 to generate a friction force, so as to stop the supporting member 11 at any position.

Afterwards, a lead wire (not illustrated) connected to the image reading unit 2 is connected to a connector 37 located on the back surface of the operation panel 4, and the cover members 13a and 13b are fastened by cover fixing screws 31, thus completing the mounting operation of the operation panel 4 to the image reading unit 2. When the operation panel 4 is removed from the image reading unit 2, a procedure reverse to the above is performed.

Figure 9:
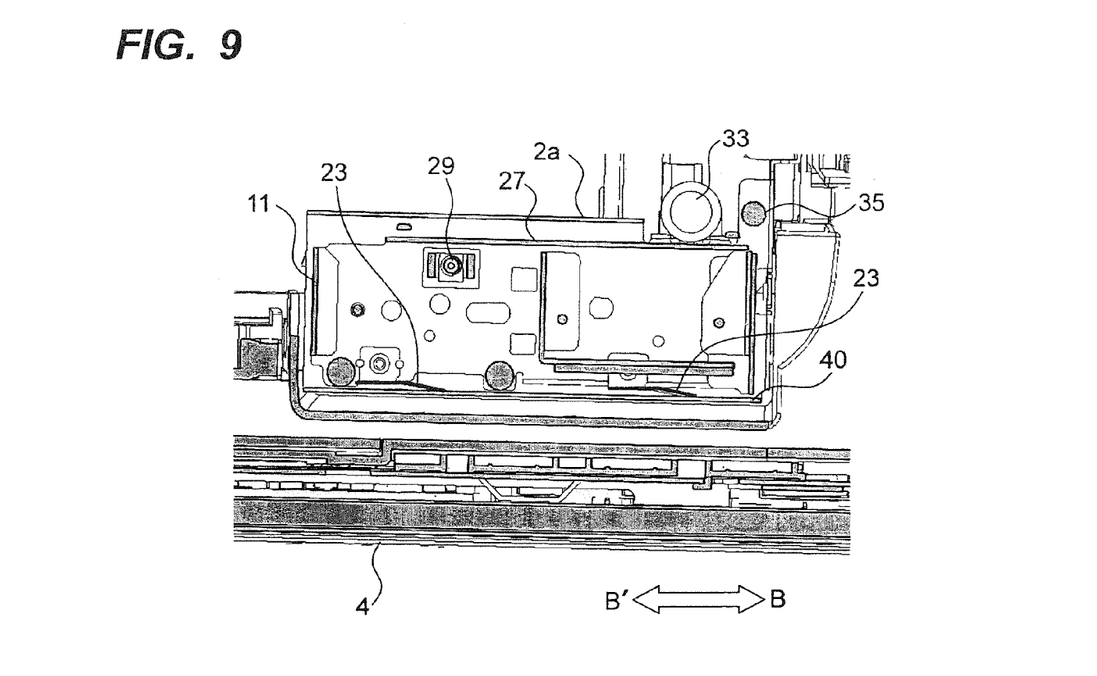
FIG. 9 illustrates a plan cross-sectional view of a lower portion of the supporting member taken in a horizontal direction.
Figure 10:
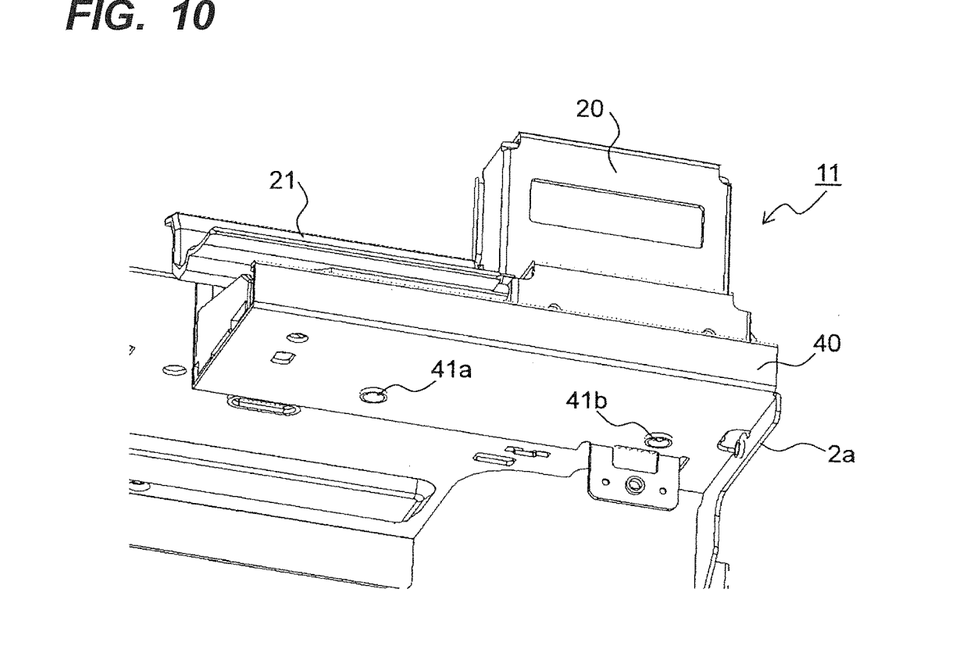
FIG. 10 illustrates a perspective view of the supporting member mounted on a mounting portion viewed from a front lower side.
Figure 11:
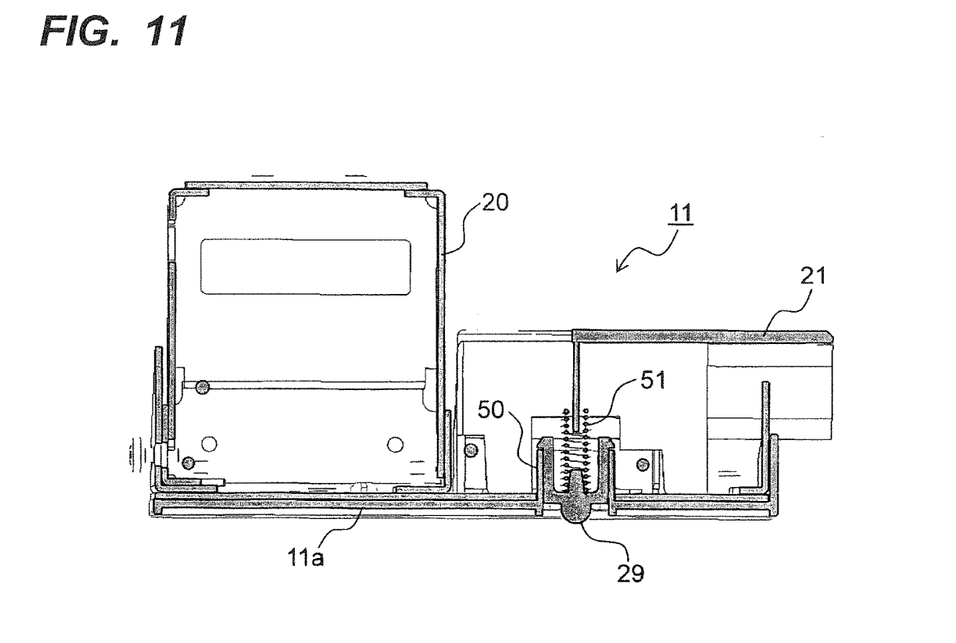
FIG. 11 illustrates a vertical cross-sectional view of the supporting member taken in a moving direction.

FIG. 9 illustrates a plan cross-sectional view of a lower portion of the supporting member 11 taken in a horizontal direction, FIG. 10 illustrates a perspective view of the supporting member 11 mounted on the mounting portion 2a viewed from a front lower side, and FIG. 11 illustrates a vertical cross-sectional view (cross-sectional view in an arrow XI-XI direction in FIG. 5) of the supporting member 11 taken in a moving direction (arrow BB' direction). As illustrated in FIG. 9, in a state where the supporting member 11 is mounted to the mounting portion 2a, the leaf springs 23, which are attached on the front lower side of the supporting member 11, are pressure contacted with the inside of a front wall portion 40 of the mounting portion 2a. This causes the supporting member 11 to be urged to the back side (upward direction in FIG. 9) by a reactive force (drag force) acting from the front wall portion 40, thus surely maintaining the engaging state of the rack 27 with the rotary damper 33.

The mounting portion 2a is made of sheet metal, and is grounded (earthed) via a main body frame (not illustrated) of the image reading unit 2. Then, when the leaf springs 23 contact the mounting portion 2a, the operation panel 4 is grounded (earthed) via the mounting stay 10 and the supporting member 11. This ensures the grounding condition of the operation panel 4 with a simple configuration.

As illustrated in FIG. 10, the mounting portion 2a includes positioning holes 41a and 41b at two positions on the bottom surface such that the positioning protrusion 29 projecting from the bottom surface 11a of the supporting member 11 engages with the positioning hole 41a or 41b. When the positioning protrusion 29 engages with the positioning hole 41a, as illustrated in FIG. 1, the operation panel 4 is arranged on a position (reference position) overlapping the opening/closing cover 8. On the other hand, when the positioning protrusion 29 engages with the positioning hole 41b, as illustrated in FIG. 13, the operation panel 4 is arranged on a position (retracted position) retracted to the outside of an opening/closing trajectory of the opening/closing cover 8.

As illustrated in FIG. 11, the positioning protrusion 29 is movably supported in the vertical direction along a guiding portion 50 formed inside the bottom surface 11a of the supporting member 11, so as to be urged downward by a compression spring 51 as a second urging member.

Figure 12:
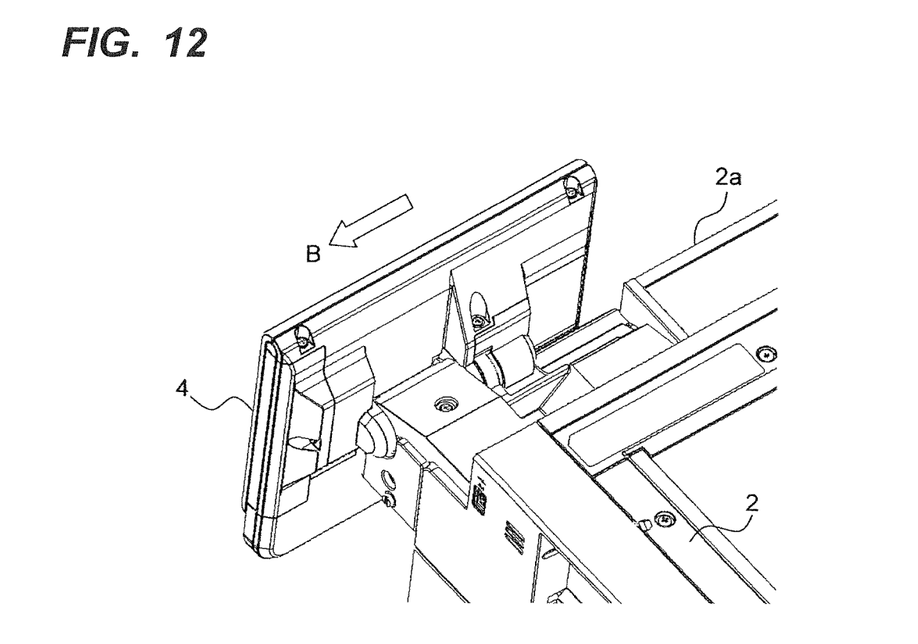
FIG. 12 illustrates a perspective view of a state where the operation panel is moved to a retracted position viewed from the back side.
Figure 13:
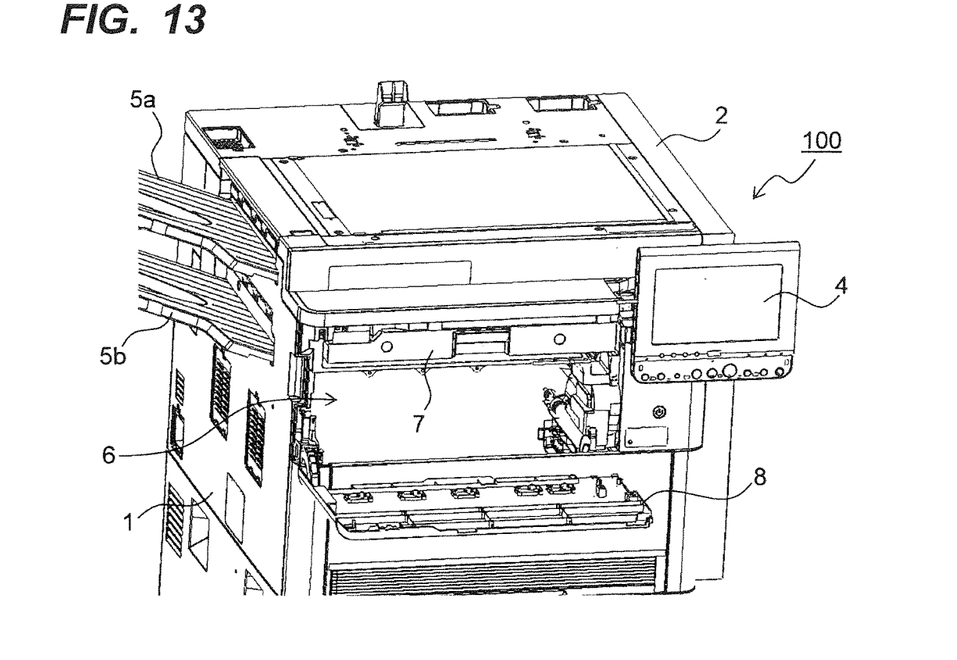
FIG. 13 illustrates a perspective view of a state where an opening/closing cover of the image forming apparatus is opened.

FIG. 12 illustrates a perspective view of a state where the operation panel 4 is moved to the retracted position viewed from the back side, and FIG. 13 illustrates a perspective view of a state where the opening/closing cover 8 of the image forming apparatus 100 is opened. By referring to FIGS. 12 and 13, and referring to FIGS. 1 to 11 as necessary, a description will be given of a jam processing procedure when a jam occurs in the in-barrel discharge space 6.

When a jam occurs on the paper sheet in the image forming apparatus 100, the operation panel 4 indicates the occurrence of the jam and the occurrence position. When the occurrence position of the jam is on the conveyance unit 7 arranged in the in-barrel discharge space 6, the opening/closing cover 8 needs to be opened to extract the conveyance unit 7. However, in a state of FIG. 1, since a part of the operation panel 4 overlaps the front side of the opening/closing cover 8, the opening/closing cover 8 cannot be opened.

Then, as illustrated in FIG. 12, the operation panel 4 is slid in the horizontal direction (arrow B direction) to be moved to the retracted position. At this time, the positioning protrusion 29 is pushed into the inside of the bottom surface 11a of the supporting member 11 against the urging force of the compression spring 51, thus detached from the positioning hole 41a. Since the rotary damper 33 engages with the rack 27 of the supporting member 11, the operation panel 4 receives an appropriate sliding load. Then, the operation panel 4 is prevented from swiftly sliding to the retracted position to be damaged.

When the operation panel 4 is slid to a position where the positioning protrusion 29 faces the positioning hole 41b, the urging force of the compression spring 51 causes the positioning protrusion 29 to project outside the bottom surface 11a, thus engaging the positioning protrusion 29 with the positioning hole 41b. An operator can recognize the operation panel 4 to be arranged on the retracted position with a touch (clicking feel) when the positioning protrusion 29 engages with the positioning hole 41b, thus improving the operability.

In a state where the operation panel 4 is moved to the retracted position, the operation panel 4 does not overlap the opening/closing trajectory of the opening/closing cover 8 and an insertion/removal trajectory of the conveyance unit 7 as illustrated in FIG. 13, thus the opening/closing cover 8 can be opened to extract the conveyance unit 7 from the in-barrel discharge space 6 to the front side. Then, after the jam process terminates, the conveyance unit 7 is inserted into the in-barrel discharge space 6 again, and the operation panel 4 is moved to the reference position after the opening/closing cover 8 is closed, thus returning to the state in FIG. 1.

According to the configuration of the embodiment, with the operation panel 4 mounted to the image reading unit 2 slidable in the horizontal direction, the opening/closing operation of the opening/closing cover 8 and the insertion/removal operation of the conveyance unit 7 can be performed without removing the operation panel 4. This improves the operability in the jam process.

The supporting member 11 integrated with the operation panel 4 is mounted to the image reading unit 2 by only the holding screws 30, thus ensuring easily mounting the operation panel 4 with only a screwdriver without using an exclusive tool. On the other hand, in transporting or storing the image forming apparatus 100, or similar case, simply removing the cover members 13a and 13b to loosen two holding screws 30 easily removes the operation panel 4.

The disclosure is not limited to the embodiment described above, and may be variously modified without substantially departing from the spirit and principles of the disclosure. For example, the shapes of the respective members and similar factors of the operation panel 4, the supporting member 11, and similar unit indicated in the above embodiment are merely examples, and can be appropriately changed according to, for example, the specification of the image forming apparatus 100.

While the above embodiment describes the image forming apparatus 100 where the conveyance unit 7 is removably attachably mounted to the in-barrel discharge space 6 and the in-barrel discharge space 6 is openable/closable by the opening/closing cover 8, the disclosure is applicable to an image forming apparatus that includes only one of a removably attachable unit or an opening/closing cover, or an image forming apparatus that includes none of the removably attachable unit or the opening/closing cover. For example, in a configuration where the in-barrel discharge space 6 includes only a paper sheet tray, moving the operation panel 4 from the reference position to the retracted position improves the visibility and the taking-out property of the paper sheet discharged into the in-barrel discharge space 6.

While the above embodiment describes the mounting structure of the operation panel 4 with an exemplary digital multi-functional peripheral indicated as the image forming apparatus 100 in FIG. 1, the disclosure is obviously applicable to a monochrome printer, a color printer, a color multi-functional peripheral, and a facsimile, not limited to the digital multi-functional peripheral.

The disclosure is available for a mounting structure of an operation unit for performing a predetermined input operation on the image forming apparatus. The use of the disclosure provides an image forming apparatus where the operation unit does not interfere a work area of an image forming apparatus body and operability of the operation unit is ensured.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
an apparatus main body;
an operation unit mounted to the apparatus main body, the operation unit indicating a state of the apparatus main body and performing an input operation to the apparatus main body; and
a moving mechanism reciprocatably supporting the operation unit between a reference position and a retracted position, the reference position overlapping a work area of the apparatus main body, and the retracted position not overlapping the work area,
wherein the moving mechanism includes:
a supporting member secured to a back side of the operation unit; and
a mounting portion located on the apparatus main body side to slidably support the supporting member,
the mounting portion including a load applying member that generates a load corresponding to a moving speed of the supporting member over a whole region between the reference position and the retracted position.

2. The image forming apparatus according to claim 1, wherein the load applying member is a rotary damper that engages with a rack formed on the supporting member.

3. The image forming apparatus according to claim 2, wherein on the supporting member, a first urging member is attached to urge the supporting member in an engaging direction of the rack with the rotary damper.

4. The image forming apparatus according to claim 3, wherein the first urging member doubles as a grounding member that grounds the operation unit via the supporting member and the mounting portion.

5. An image forming apparatus, comprising:
an apparatus main body;
an operation unit mounted to the apparatus main body, the operation unit indicating a state of the apparatus main body and performing an input operation to the apparatus main body; and
a moving mechanism reciprocatably supporting the operation unit between a reference position and a retracted position, the reference position overlapping a work area of the apparatus main body, and the retracted position not overlapping the work area,
wherein the moving mechanism includes:
a supporting member secured to a back side of the operation unit; and
a mounting portion located on the apparatus main body side to slidably support the supporting member,
the supporting member including a positioning protrusion that engages with any of a plurality of positioning holes formed on the mounting portion when the supporting member is arranged on any of a plurality of positions including the reference position and the retracted position.

6. The image forming apparatus according to claim 5, wherein the positioning protrusion is supported protrudable and retractable with respect to the supporting member and urged by an urging member in a projecting direction, and the positioning protrusion projects out of the supporting member by an urging force of the urging member at a position facing the positioning hole, so as to engage with the positioning hole.

* * * * *